May 24, 1927. 1,630,157
J. M. AHLGREN ET AL
MOLDING APPARATUS
Filed April 26, 1926  3 Sheets-Sheet 2

Inventor
John M. Ahlgren,
Joseph V. Bretaud,
By
Attorneys

May 24, 1927.  J. M. AHLGREN ET AL  1,630,157

MOLDING APPARATUS

Filed April 26, 1926   3 Sheets-Sheet 3

Inventor
John M. Ahlgren,
Joseph V. Bretaud,
By
Attorneys

Patented May 24, 1927.

1,630,157

UNITED STATES PATENT OFFICE.

JOHN M. AHLGREN AND JOSEPH V. BRETAUD, OF DETROIT, MICHIGAN, ASSIGNORS TO AMERICAN RUBBER PRODUCTS COMPANY, OF DETROIT, MICHIGAN, A CORPORATION OF MICHIGAN.

MOLDING APPARATUS.

Application filed April 26, 1926. Serial No. 104,641.

This invention relates to a molding apparatus and has special reference to the production of hard rubber storage battery containers used in the automotive and radio industries.

Our invention aims to provide a molding apparatus by which considerable time may be saved, compared to the usual method of making a container, because there are no loose parts to be handled by an operator and no plates to be withdrawn or adjusted, which because of their heated condition, might be injurious to an operator. This saving of time is in part due to the novel construction of the mold which will withstand a tremendous pressure without any danger of the parts of the mold being displaced.

Our invention further aims to provide a molding apparatus by which uniform products may be produced. The rubber or composite products are adapted to be vulcanized and our apparatus includes a novel circulating system by which a heating medium may be properly and equally distributed during vulcanization, so that the vulcanized product will have a uniform composition and possess great strength.

Our invention further aims to provide a molding apparatus including a novel mold and core with side liners or plates of the mold arranged to be shifted in and out of the mold in addition to the movement of the core relative to the mold. Fluid or liquid under pressure may be utilized for shifting the movable elements of the apparatus and the design of the apparatus precludes any danger of the heating agent interfering with packing, or liquid interfering with the heated mold, thus providing an apparatus that requires minimum repair and attention.

The above are a few of the characteristics of our invention and others will hereinafter appear as the apparatus is described by aid of the accompanying drawings, wherein—

Figure 9:
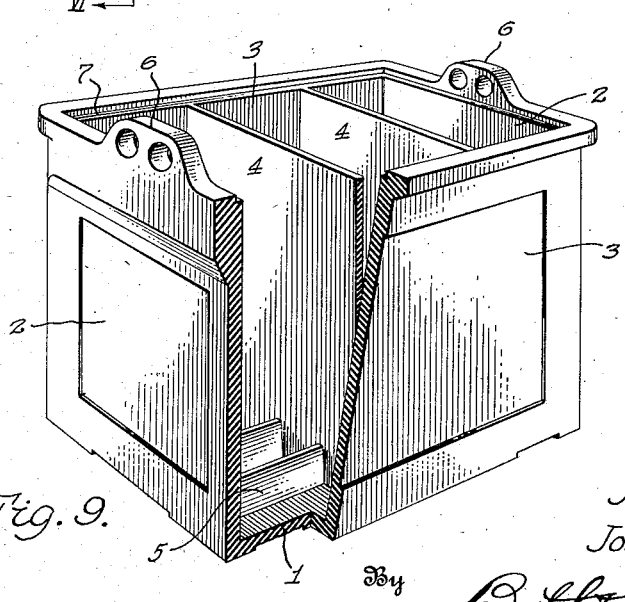
Fig. 9 is a perspective view of a hard rubber storage battery container, partly broken away and partly in section.

First to understand the container to be produced by the molding apparatus. It is made of hard rubber or any other acid proof moldable material and the preferred form of the container is shown in Fig. 9. There is a bottom wall 1, end walls 2, side walls 3, partitions 4 and plate supporting bottom ribs 5. The end walls 2 may be formed with apertured lugs or finger pieces 6; the upper edges of the walls 2 and 3 with a seat or sealing shoulder 7 and the outer faces of said walls with panels, while the ribs 5 and the partitions 4 may be slightly tapered inwardly from the bottom wall 1 to the upper edges of the ribs or partitions. This container is simply an example as there are many other forms of containers that may be produced by our apparatus by simply changing the mold and like elements which contribute to the configuration and formation of the container.

Figure 1:
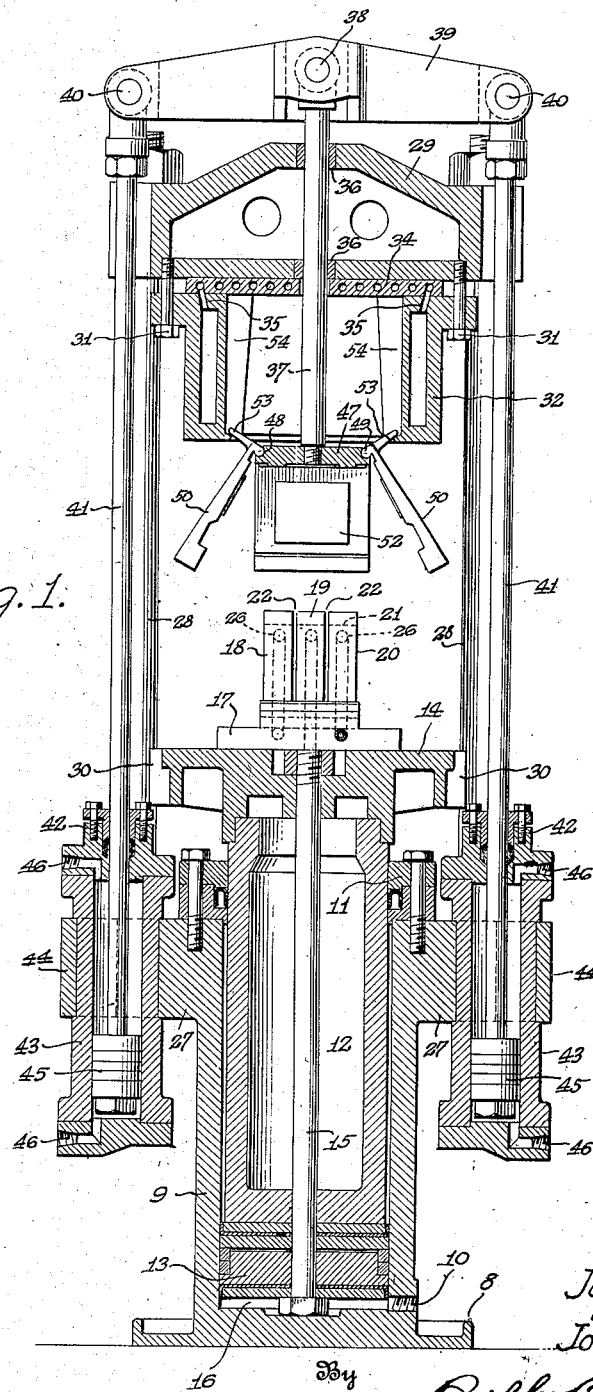
Figure 1 is a vertical transverse sectional view of the apparatus showing the core and mold liners in lowered positions, as though a molded product had been removed from the apparatus.
Figure 2:
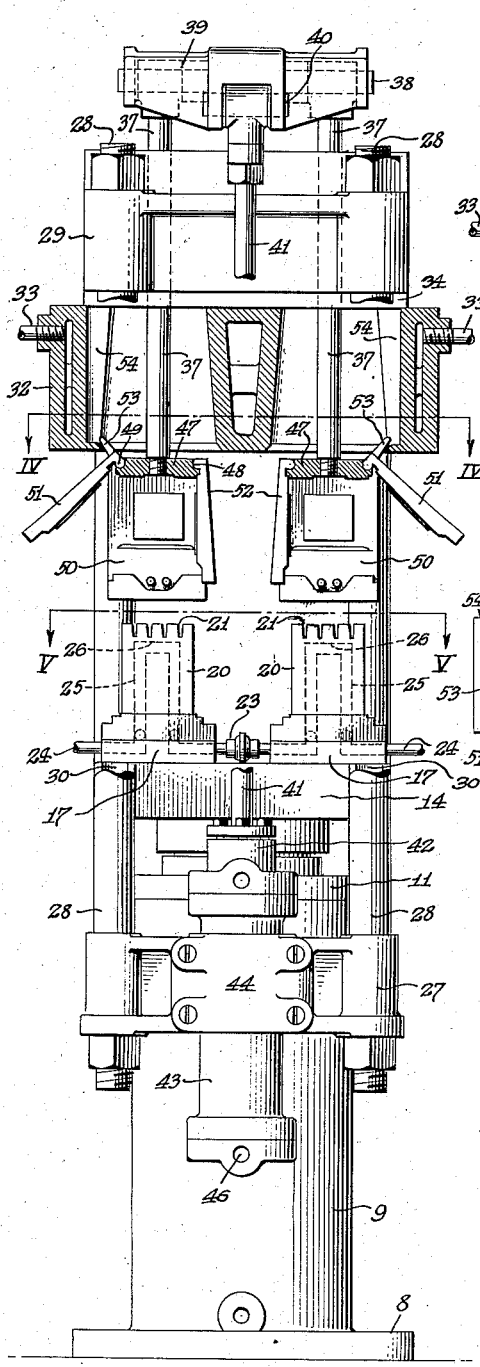
Fig. 2 is a side elevation of the apparatus with parts of the mold in vertical section.
Figure 3:
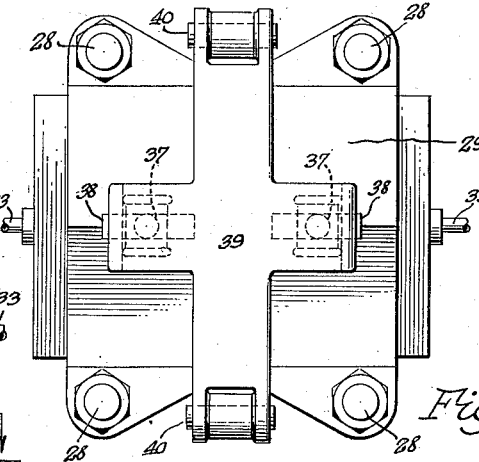
Fig. 3 is a plan of the molding apparatus.
Figure 4:
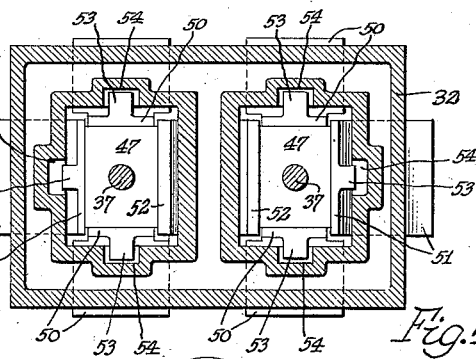
Fig. 4 is a horizontal sectional view of a mold taken on the line IV—IV of Fig. 2.
Figure 5:
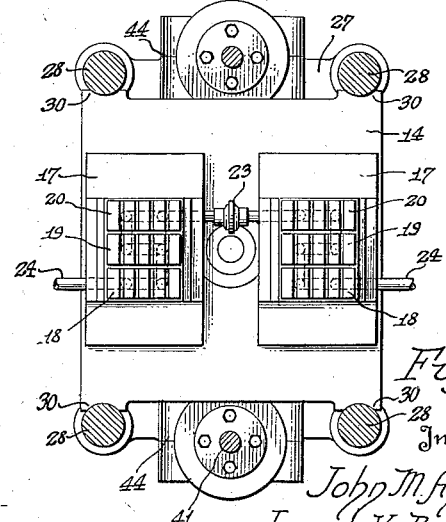
Fig. 5 is a horizontal sectional view taken on the line V—V of Fig. 2.

Considering Figs. 1 and 2, the apparatus comprises a base or footing 8 having an upright cylinder 9 thereon with the lower closed end of the cylinder provided with one or more passages 10 by which water or other liquid, under pressure, may be admitted to or exhausted from the cylinder 9. On the upper end of the cylinder 9 is a conventional form of stuffing box 11 and slidable through the stuffing box and in the cylinder 9 is a hollow ram 12 having its lower end provided with a conventional form of piston 13.

Mounted on the upper end of the arm 12 is a table 14 that may be secured in place by a tie rod 15 axially of the ram 12 and the piston 13, said tie rod combining the table, arm and piston together, besides limiting the down stroke of the arm so that there is always a space or chamber 16 below the arm communicating with the passage 10 for the admission of a motive liquid or fluid.

Suitably mounted on the table 14 are the base pieces 17 of substantially hollow cores, composed of parallel spaced apart members 18, 19 and 20. These members have the upper ends thereof grooved, as at 21 for the formation of the ribs 5 and the spaces 22 between the members 18, 19 and 20 are for the formation of the partitions 4.

Figure 7:
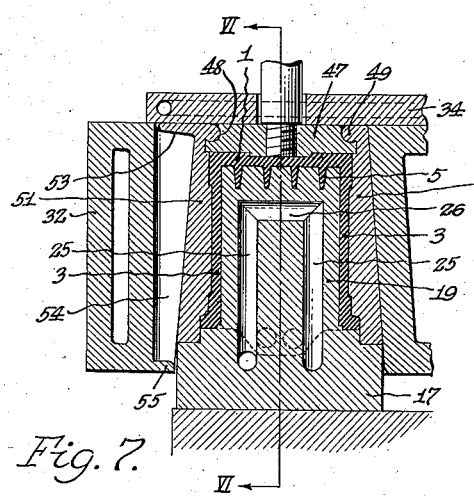
Fig. 7 is a cross sectional view of the same showing line VI—VI for the section of Fig. 6.
Figure 8:
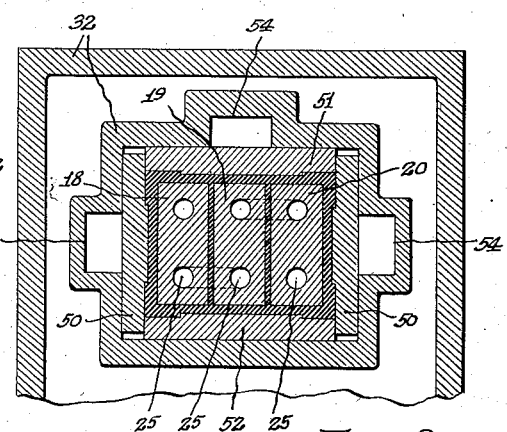
Fig. 8 is a horizontal sectional view taken on the line VIII—VIII of Fig. 6.

For vulcanizing or heat treating purposes steam or some other heating agent, under pressure, is utilized and the base pieces 17 and the members 18, 19 and 20 of the cores are made hollow or provided with passages so that the steam may be circulated therethrough. Considering Figs. 1, 2 and 5 to 8 inclusive, the base pieces have a connecting pipe 23 and inlet and outlet pipes 24. These pipes communicate with vertical passages 25 and transverse passages 26, the vertical and transverse passages being formed in each of the members 18, 19 and 21 so that the walls of these members may be thoroughly heated, and by an arrangement of transverse passages in the base pieces 17, as shown in Fig. 8, the steam may be circulated from one core to the other so as to maintain a uniform heat within the cores.

The upper end of the cylinder 9 is provided with lateral extensions 27 for columns 28 and the upper ends of said columns are connected by a head 29. The columns 28 are preferably in the form of tie rods, four in number, and said rods are slidably engaged by corner portions 30 of the table 14.

The head 29 is preferably hollow and attached to the lower face of said head, by screw bolts 31 or other fastening means is a hollow mold shell 32 having steam connections 33 so that steam or any other heating agent may be circulated through the shell to thoroughly heat the walls thereof. Interposed between the head 29 and the mold shell 32 is a cored or drilled steam plate 34 communicating with the shell 32 by ports 35, so that the steam admitted to the mold shell may circulate through the steam plate 34 and heat said plate.

The head 29 is provided with vertically alining bushings 36 and slidable in said bushings are suspension rods 37 having the upper ends thereof pivotally connected, as at 38, to an equalizing member 39 located above the hollow head 29. The equalizing member 39 is pivotally connected, as at 40 to the upper ends of long piston rods 41 which extend through stuffing boxes 42 into auxiliary double acting hydraulic cylinders 43 supported by side extensions 44 of the main cylinder 9. The lower ends of the piston rods 41 have pistons 45 within the cylinders 43 and the ends of said cylinders are ported, as at 46 so that water or other liquid, under pressure, may be utilized for reciprocating the piston rods 41 to raise or lower the suspension rods 37. The equalizing member 39 compensates for any slight variations in the movement of the piston rods 41 and prevents any binding action.

Figure 6:
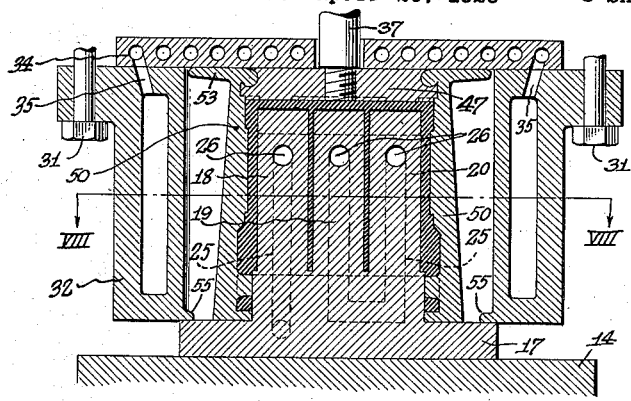
Fig. 6 is an enlarged detail sectional view of the mold with the liners and core therein showing the formation of a container.

The suspension rods 37 are provided with substantially rectangular heads 47 and each head has its edges formed with hinged sockets 48 for the hinge edges 49 of end mold liners 50 and side mold liners 51 and 52. The end mold liners 50 have the confronting ends thereof shaped to form the outer faces of the end walls 2 of the container, also the finger pieces 6 of said end walls, and the confronting faces of the side mold liners 51 and 52 are shaped to form the outer faces of the walls 3 of the container. The outer faces of all of the mold liners taper inwardly from the lower edges of said liners to the upper hinged edges thereof, as best shown in Figures 6 and 7 and these tapered outer faces of the liners are adapted to engage correspondingly tapered inner walls of the mold shell 32 so that the mold liners may be clamped together to form molds open at the lower ends to receive cores and quantities of rubber or other moldable material placed on the cores and forced into the mold cavities.

The upper hinged edges of the mold liners 50 and 51 are provided with lateral extensions 53 which are movable in ways 54 provided therefor in the inner walls of the mold shell, and at the lower end of each way is a bottom wall or stop 55. The extensions 33 of the mold liners 50 and 51 are adapted to impinge against the stops 55 and cause the mold liners 50 and 51 to be swung outwardly at an angle, for instance as shown in Fig. 2, thus clearing the end and front walls 2 of a molded container leaving the rear wall of the container engaged by the mold liner 52. This liner being hinged can be manually swung out of engagement with the molded container as the container is supported and removed from the mold.

Assuming that the molding apparatus is as shown in Figs. 1 and 2, a ball or quantity of rubber or other moldable composition is placed on top of the cores. Motive fluid is then admitted to the auxiliary cylinders 43 to raise the piston rods 41, the equalizing member 39, the suspension rods 37 and the mold liners carried by said rods. This operation causes the mold liners to be drawn into the mold shell. Motive fluid or liquid is now admitted to the main cylinder 9 to raise the ram 12 causing the ball of rubber or other material to be pressed into the mold cavities to fill all spaces between the cores and the mold liners. Pressure is maintained on the material within the mold cavities during a period of vulcanization because of the heated mold shell and cores. The length of time for vulcanization and maintaining pressure depends on the thickness of the material to be molded and the temperature of the heating agent or mold. When vulcanization is completed the arm 12 is lowered and the core is withdrawn.

Motive liquid is then admitted to the auxiliary cylinders 43 to lower the piston rods 41 and cause the suspension rods 37 to push the mold liners out of the mold shell. As this takes place the mold liners 50 and 51 are swung away from the molded containers which adhere to the steam plates 47 and the mold liners 52. The mold liners 52 may be swung outwardly by pressure of the hand applied to the lower edge of the mold liner, and at the same time the hands withdraw the containers from the top plate. The apparatus is now ready to receive another supply of moldable material for the formation of other containers. The arrangement of the auxiliary cylinders utilize motive liquid for shifting the mold liners out of the mold could be varied and possibly placed overhead, but we prefer the arrangement shown because these cylinders are away from the heat and consequently the packings of the cylinders give much better service. Furthermore, any leakage of water from the cylinders will not drop on to the mold and its liner and spoil the product; it being very essential that the inside or cavities of the mold be perfectly dry, otherwise steam bubbles will form and cause imperfect container walls.

The container has been formed in an inverted position because the cores are more readily withdrawn and the products ejected from the mold in such positions as to be safely handled. There is no danger of the partitions 4 of the container being disrupted by withdrawal of the cores and while we have herein shown an apparatus devoid of steam fittings and water connections, it is obvious that suitable flattened connections are employed so that an attendant of the apparatus can readily control the same. Furthermore, the apparatus shown and described produces two containers but may be readily enlarged to produce a plurality of containers in which instance, there would be attendants for unloading the formed containers and supplying material to the cores of the apparatus.

What we claim is:—

1. In a molding apparatus, a stationary heated mold, a heated core movable into and out of said mold, mold liners movable into and out of said mold, core moving means, and liner moving independent of said core moving means and operatable through said mold, said liner moving means including piston rods, an equalizing member connecting said piston rods, and a suspension rod supporting said liners relative to said equalizing member.

2. A molding and vulcanizing apparatus comprising a reciprocable ram, a heated stationary open bottom mold above said ram, a heated core on said ram and adapted to be moved into and out of said mold, shiftable liners adapted to form a mold cavity in said mold, and means operatable adjacent said ram and independent of said ram adapted for shifting said liners in and out of said mold.

3. A molding and vulcanizing apparatus as called for in claim 2, wherein said means includes piston rods, an equalizing member connecting said rods, and suspension rods carried by said equalizing member and supporting said liners.

4. A molding and vulcanizing apparatus as called for in claim 2, wherein said shiftable liners are adapted to move towards one another by contact with said mold, and move away from one another when shifted out of said mold.

In testimony whereof we affix our signatures.

JOHN M. AHLGREN.
JOSEPH V. BRETAUD.